(12) United States Patent
Selby et al.

(10) Patent No.: US 10,775,907 B2
(45) Date of Patent: Sep. 15, 2020

(54) TRACKBALLS

(71) Applicant: CURSOR CONTROLS LIMITED, Nottinghamshire (GB)

(72) Inventors: Nathan James John Selby, Lincolnshire (GB); Scott Alan Cousins, Cambridgeshire (GB); Christopher David Dunn, Nottinghamshire (GB)

(73) Assignee: Cursor Controls Limited, Newark (GB)

( * ) Notice: Subject to any disclaimer, the term of this patent is extended or adjusted under 35 U.S.C. 154(b) by 0 days.

(21) Appl. No.: 16/306,742

(22) PCT Filed: Jun. 6, 2017

(86) PCT No.: PCT/GB2017/051640
§ 371 (c)(1),
(2) Date: Dec. 3, 2018

(87) PCT Pub. No.: WO2017/212252
PCT Pub. Date: Dec. 14, 2017

(65) Prior Publication Data
US 2019/0138121 A1 May 9, 2019

(30) Foreign Application Priority Data

Jun. 6, 2016 (GB) .................................. 1609926.9

(51) Int. Cl.
*G06F 3/0354* (2013.01)
*G06F 3/01* (2006.01)

(52) U.S. Cl.
CPC .......... *G06F 3/03549* (2013.01); *G06F 3/016* (2013.01); *G06F 3/03541* (2013.01); *G06F 3/0354* (2013.01)

(58) Field of Classification Search
CPC .... G06F 3/03549; G06F 3/016; G06F 3/0354; G06F 3/03541; G06F 3/03543
See application file for complete search history.

(56) References Cited

U.S. PATENT DOCUMENTS

| 6,084,574 A * | 7/2000 | Bidiville ............... G06F 3/0312 345/163 |
| 6,172,665 B1 * | 1/2001 | Bullister ............... G06F 3/0213 345/163 |
| 2002/0109674 A1 | 8/2002 | Tada et al. |
| 2010/0033432 A1 * | 2/2010 | Sutton ................... G06F 1/3203 345/167 |

FOREIGN PATENT DOCUMENTS

| EP | 0520089 | 12/1992 | |
| GB | 2341439 A * | 3/2000 | ............. G05G 25/04 |

(Continued)

*Primary Examiner* — Julie Anne Watko
(74) *Attorney, Agent, or Firm* — McCracken & Gillen LLC

(57) ABSTRACT

A trackball includes a ball, a housing including a recess arranged to receive at least part of the ball and means for urging the ball, without physical or direct contact, to remain in the recess, wherein the surface of the recess is fully sealed to form an impenetrable barrier such that foreign substances are prevented from entering the interior of the housing. This arrangement may make the trackball more hygienic to use and easier to clean than conventional trackballs.

14 Claims, 6 Drawing Sheets

(56) References Cited

FOREIGN PATENT DOCUMENTS

| | | | | | |
|---|---|---|---|---|---|
| GB | 2387428 | A | * | 10/2003 | ........... G06F 3/0312 |
| JP | 2001-507839 | A | * | 6/2001 | |
| JP | 2011145724 | A | * | 7/2011 | |
| JP | 2012221012 | A | * | 11/2012 | |
| WO | WO-9830971 | A1 | * | 7/1998 | ......... G06F 3/03541 |
| WO | 0020929 | | | 4/2000 | |

* cited by examiner

TRACKBALLS

TECHNICAL FIELD

The invention relates to trackballs. Trackballs may be arranged for use in a variety of applications and scenarios, such as medical, marine, aerospace and/or defence environments, for providing inputs to a controller.

BACKGROUND

Trackballs which are used in such environments may require cleaning of one or more parts of the trackballs. For instance, a ball, a housing, a bearing element and/or another part of a trackball may need to be wiped, sluiced or sprayed with fluid to remove accumulated dirt, oil, water and/or other substances. This can be particularly important if the trackball is used in medical environments in which the trackball comes into contact with patients or medical practitioners, whose health could be jeopardised if bacteria or viruses, for example, contaminate the trackball.

An example of a conventional trackball 11 is illustrated in FIGS. 1A and 1B. Like other conventional trackballs, the trackball 11 includes a ball 13 and a plurality of buttons 15 that act as mechanical function keys.

The ball 13 of trackball 11 is retained within a housing of the trackball 11 by a retaining ring 17. As well as retaining the ball 13 within the housing of the trackball 11, the retaining ring 17 may control or affect the force a user of the trackball 11 needs to apply to the ball 13 to cause the ball 13 to rotate relative to the housing. This force may be referred to as a "tracking force". For instance, the retaining ring 17 may be in direct contact with the ball 13 such that there is friction between the retaining ring 17 and the ball 13. Alternatively, an intervening component or intervening components, such as a ball seal and/or a sponge, may be located between the retaining ring 17 and the ball 13 such that there is friction between a component and the ball 13. The magnitude of the friction may affect how easy it is for the user to rotate the ball 13 relative to the housing. To make cleaning the trackball easier, the retaining ring 17 may be removable (e.g. through a twisting unlocking motion or otherwise) to allow the ball 13 and/or other components to be removed for cleaning.

The buttons 15 and retaining ring 17 may be positioned adjacent to one another or to other components of the trackball 11. However, this leaves gaps 19 between the ball 13, the buttons 15, the retaining ring 17 and/or other components of the trackball 11. The dirt, oil, water and other substances referred to above can accumulate in these gaps. The gaps are difficult to clean and therefore present a hygiene risk as well as an opportunity for substances which can damage the trackball 11 to find their way into the trackball 11. Such substances may become trapped underneath the retaining ring 17 and/or underneath the buttons 15.

It is desirable to provide a trackball which overcomes or goes some way towards overcoming the problems discussed above.

SUMMARY

Accordingly there is provided a trackball including: a ball; a housing including a recess arranged to receive at least part of the ball; and only non-mechanical means for urging the ball to remain in the recess, the non-mechanical means being arranged to improve the cleanability of the trackball.

The non-mechanical means is arranged to urge the ball to remain in the recess without contacting the ball. Preferably, the trackball does not include a retaining ring for urging the ball to remain in the recess. The non-mechanical means may be arranged to apply sufficient force to the ball to prevent the ball from falling out of the recess if the trackball is inverted.

Preferably, the trackball comprises at least one bearing element mounted on or forming part of the housing, the at least one bearing element being arranged to support the ball in the recess. Preferably, the at least one bearing element comprises one or more of: a ball bearing element, and a stationary bearing element.

Advantageously, these features may make the trackball more hygienic to use and easier to clean than conventional trackballs. The non-mechanical means for urging the ball to remain in the recess may help to minimise the number of gaps between trackball components in which substances can accumulate. In particular, the non-mechanical means may take the place of a retaining ring, a seal and/or other components for urging a ball to remain in a trackball recess. The absence of a retaining ring or other mechanical means for urging the ball to remain in the recess may make the trackball easier to clean by minimising the number of obstacles to wiping, sluicing or otherwise removing substances from the trackball.

Preferably, the ball is a magnetic ball and the non-mechanical means for urging the ball to remain in the recess comprise at least one magnet. Optionally, the trackball may include means for moving the magnet relative to the recess between a first position and a second position so that a distance between the magnet and the magnetic ball is varied.

Advantageously, this may allow a force experienced by the ball as a consequence of the magnetic field emanating from the magnet to be controlled or changed.

In some embodiments, the magnet may be a permanent magnet. In other embodiments, the magnet may be an electromagnet. In some embodiments, a plurality of magnets may be provided. The plurality of magnets may all be permanent magnets, may all be electromagnets, or may include at least one permanent magnet and at least one electromagnet. Advantageously, having at least one permanent magnet may help ensure that the magnetic ball remains within the recess even when power to the trackball is unavailable or switched off.

In some embodiments, the means for moving the magnet includes a motor, a solenoid, a rack and pinion, a linear guide, a lever arrangement or a screw thread.

In some embodiments, the trackball additionally includes a capacitive user input device. Advantageously, a capacitive user input device may mean that the trackball does not require mechanical buttons. This may reduce the number of places (e.g. gaps between buttons and other components of the trackball) in which dirt, water, oil, etc. can be accumulated and may make cleaning of the trackball easier.

In some embodiments, the magnetic ball includes a magnetic core, a non-magnetic but magnetically permeable outer layer and/or a resin comprising magnetic filings or particles.

In some embodiments, the trackball is arranged to move the magnet in order to provide feedback or information to a user of the trackball via perceptible acceleration of the ball and/or changes in resistance to movement of the ball which may be sensed by a user's fingers during use.

Preferably, the magnet is mounted on the housing in the vicinity of the recess.

BRIEF DESCRIPTION OF THE DRAWINGS

Specific embodiments of the invention will now be described by way of non-limiting examples, in which.

DETAILED DESCRIPTION

The present embodiments represent the best ways currently known to the applicant of putting the invention into practice, but they are not the only ways in which this can be achieved. They are illustrated, and they will now be described, by way of example only.

In this specification, the term "non-mechanical" is used to mean without physical contact or without direct contact.

Figure 2:
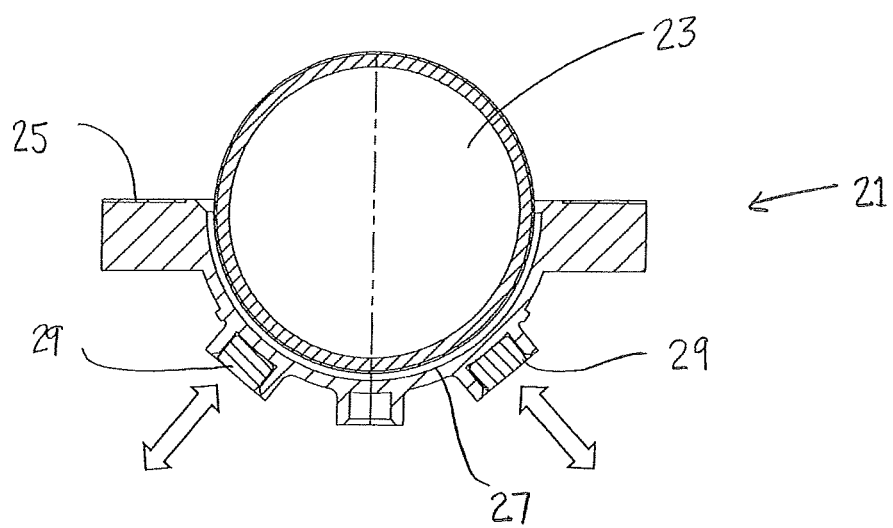
FIG. 2 schematically illustrates in cross section a trackball according to an embodiment of the invention.
Figure 5:
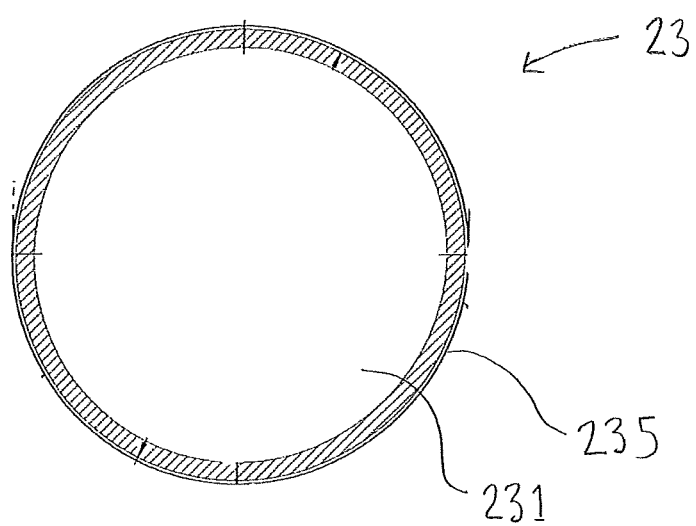
FIG. 5 schematically illustrates in cross section a component of a trackball according to an embodiment of the invention.

With reference to FIG. 2, an example of a trackball 21 is illustrated in cross section. The trackball 21 includes a magnetic ball 23. In the context of this document, "magnetic" means magnetically attractable and/or magnetically repellable, i.e. capable of being attracted and/or repelled by a magnet or accelerated by a magnetic field. In the illustrated embodiment, the magnetic ball 23 comprises a magnetic core 231 and a non-magnetic but magnetically permeable outer layer 235 (see FIG. 5). In the illustrated examples, the magnetic core 231 has a diameter of approximately 50 mm and the non-magnetic, magnetically permeable outer layer 235 has a thickness of approximately 0.4 mm. The overall diameter of the illustrated magnetic ball 23 is therefore approximately 50.8 mm. However, in other embodiments, the magnetic ball 23 may have different dimensions.

The magnetic ball 23 may include a resin comprising magnetic filings or particles. In some embodiments, the ball may not include a non-magnetic outer layer and may be solely a generally homogeneous magnetic core, or may include multiple magnetic layers. In some embodiments, the magnetic ball 23 may be translucent or transparent while in other embodiments the ball 23 may be opaque. The trackball 21 may include a light (such as an LED) to help a user of the trackball 21 see and use the ball 23, e.g. in darkened environments, and/or as a mechanism for providing feedback or information to the user, e.g. by varying the brightness or colour of the light emitted, flashing the light (e.g. in particular patterns), or otherwise varying an output of the light.

The trackball 21 also includes a housing 25. The housing 25 may be formed of any suitable material or materials, such as plastic and/or metal, depending on the intended application of the trackball 21 and/or the environment in which the trackball 21 is intended to be used.

The housing 25 includes a recess 27 which is arranged to receive at least part of the magnetic ball 23. In the illustrated embodiment, the recess 27 is approximately hemispherical and receives approximately half of the ball 23. However, in other examples, the recess 27 may be larger, such that it receives a greater proportion of the ball 23, or smaller, such that it receives a lesser proportion of the ball 23. The dimensions of the recess 27 may be chosen such that a desired proportion of the ball 23 protrudes above the surface of the housing 25. For instance, in some circumstances, it may be advantageous for the ball 23 to protrude a long way from the recess 27, away from the surface of the housing 25. However, in other circumstances, it may be desirable for the top of the ball 23 to be approximately flush with the surface of the housing 25.

The recess 27 may include one or more bearing elements arranged to rotatably support the magnetic ball 13, i.e. to support the ball 13 in such a way that it can rotate relative to the housing 25. Such a bearing element might take the form of a curved surface of the recess 27 or a discrete bearing element (such as a ball bearing element, a stationary or fixed-point bearing element e.g. an injection-moulded projection or other protruding feature, or another suitable form of bearing element) located in the recess 27 (e.g. on a surface of the recess 27 or embedded in a surface of the recess 27). The bearing element may be any suitable bearing element arranged to support the magnetic ball 23 in such a way that the ball 23 can rotate relative to the housing 25.

Where there are multiple bearing elements, they may be positioned to achieve particular respective frictional effects on the ball 23. For example, the bearing elements may be positioned such that equal frictional forces are applied to the ball 23 at the different bearing elements. Alternatively, it may be desired to create a greater frictional force at one or some of the bearing elements, in which the case the bearing elements may be positioned accordingly.

The recess 27 is designed such that the number of corners, gaps and/or protrusions on the surface of the recess 27 is minimised. For example, the recess 27 preferably has a substantially smooth and unbroken surface so that the number of places where substances can accumulate is minimised and the number of obstructions to a cloth or a flow of water across the surface of the recess 27 is minimised.

The surface of the recess 27 forms an impenetrable barrier which prevents substances from entering the interior of the housing 25 of the trackball 21. This and the fact that the non-mechanical means for urging the ball 23 to remain in the recess 27 allows the trackball 21 not to have a conventional retaining ring 17 enables a user of the trackball 21 to clean the trackball 21 conveniently, e.g. by sluicing water, disinfectant and/or another fluid through the recess 27, optionally without removing the ball 23 from the recess 27. In some embodiments, a drain may be provided in the recess 27 to allow such fluid to exit the recess 27. The drain may be positioned at the lowest point of the recess 27, such that the fluid can drain out of the recess 27 under gravity.

The trackball 21 additionally includes magnets 29. The magnets 29 are mounted on the housing 25 in the vicinity of the recess 27. In particular, the magnets are mounted on the housing 25 such that magnetic field lines emanating from the magnets 29 enter the recess 27. The magnets 29 are arranged such that, when the ball 23 is in the recess 27, the magnets 29 act upon the magnetic ball 23 to urge the magnetic ball 23 to remain in the recess 27.

Figure 1A:
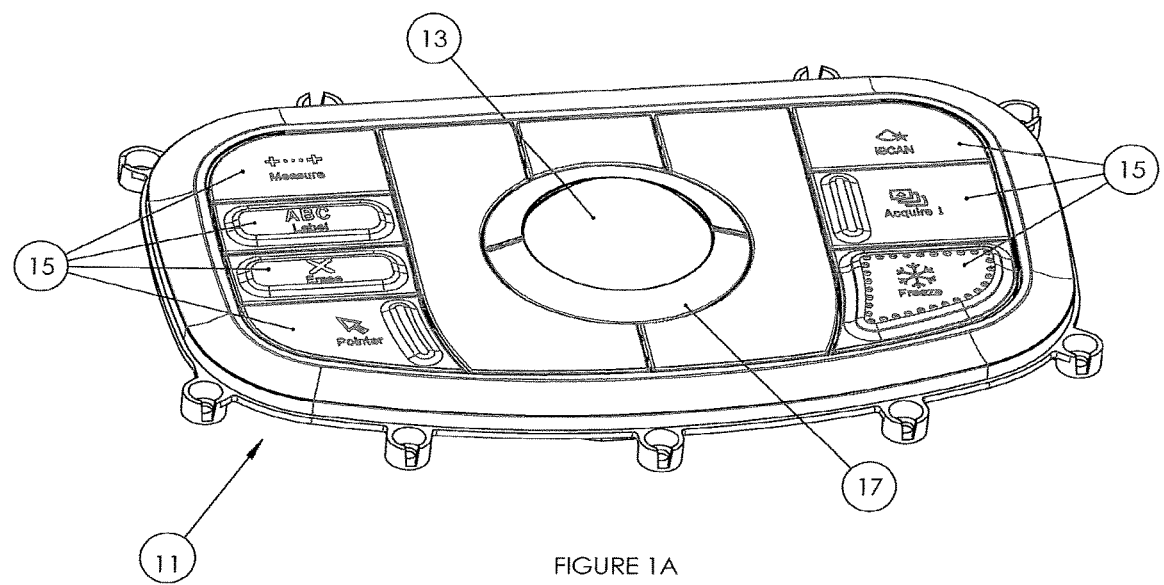
FIGS. 1A and 1B schematically illustrate a prior art trackball.
Figure 1B:
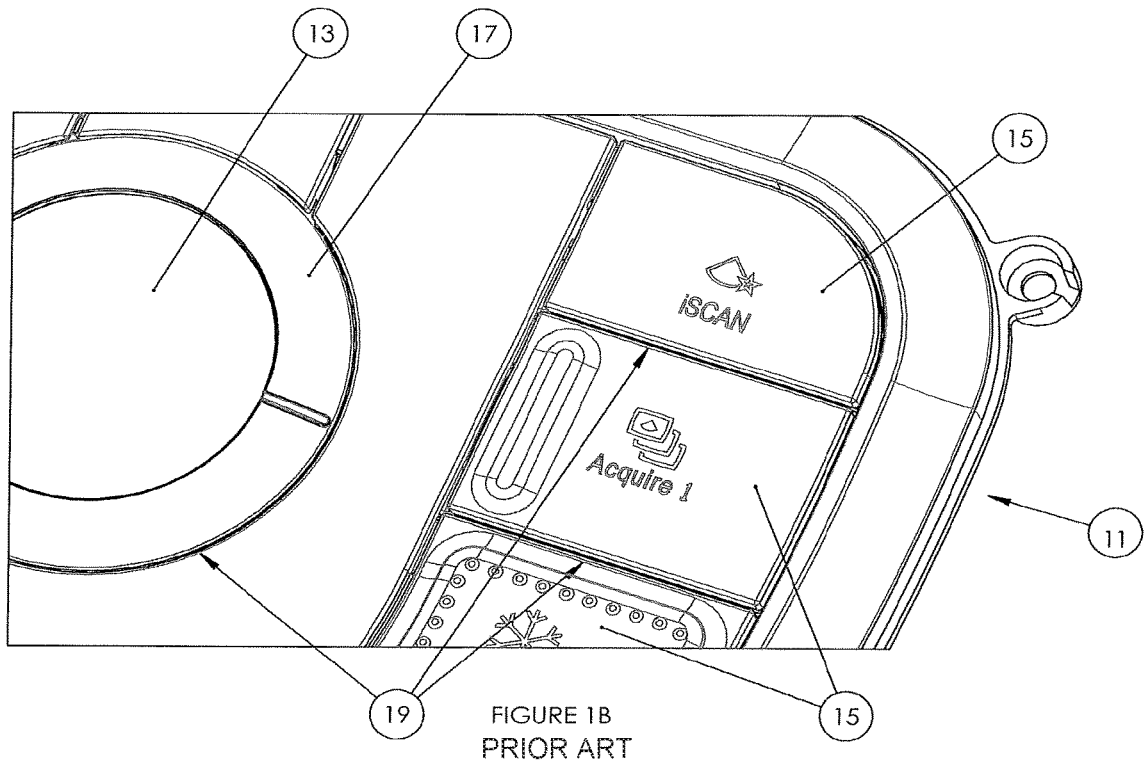

Advantageously, the presence of one or more magnets 29 arranged to act upon the magnetic ball 23 to urge the ball 23 to remain in the recess 27 means that trackballs according to embodiments of the invention do not require a retaining ring 17 (see FIG. 1) or other associated components. The magnetic ball 23 is instead retained within the recess 27 by the magnets 29. The magnets 29 may ensure that the magnetic ball 23 remains sufficiently close to a sensor of the trackball 21 arranged to track the rotation of the ball 23 relative to the housing 25.

The absence of a retaining ring means that the number of places in which dirt, oil, water, bacteria, viruses, etc. can accumulate is reduced. It also means that cleaning of trackballs according to embodiments of the invention is easier. A user of the trackball may still remove the ball 23 for cleaning, either by applying sufficient force to the magnetic ball 23 (e.g. using his or her digits or a tool) to overcome the magnetic force exerted by the magnets 29 on the ball 23 or, if the magnets 29 are electromagnets, by switching the magnets 29 off so that the magnetic ball 23 is no longer urged to remain in the recess 27 by the magnets 29.

In some embodiments, the magnets 29 may be mounted in or on a portion of the trackball 21 defining the recess 27, such as in or on an inside surface/wall of the recess 27, or may be mounted outside the recess 27, as illustrated in FIG. 2, such as on an outside surface/wall of the recess 27. The material forming the recess 27 may therefore be a non-magnetic but magnetically permeable material, such as a plastic. Positioning the magnets 29 outside the recess 27, e.g. behind a fully sealed surface/wall of the recess 27, may advantageously mean that fewer or even no features are required on the user-facing (ball) side of the recess surface/wall to allow the magnets 29 to act upon the magnetic ball 23, making the user-facing (ball) surface/wall of the recess 27 easier to clean.

In the specific example illustrated, the magnets 29 attract the magnetic ball 23 when the ball 23 coincides with magnetic field lines emanating from the magnets 29 into the recess 27. Therefore, the magnets 29 act upon the magnetic ball 23 to try to pull the magnetic ball into the recess 27 once the ball 23 is sufficiently far inside or close to the recess 27 that it is within the magnetic field of at least one of the magnets 29.

In other embodiments, the magnetic ball 23 and the magnets 29 may be arranged such that the magnets 29 repel the magnetic ball 23 when the ball 23 coincides with magnetic field lines emanating from the magnets 29. In such cases, the magnets 29 may be mounted on the housing 25 at different locations from the ones illustrated in FIG. 2 such that, when the magnetic ball 23 is sufficiently far inside or close to the recess 27, the magnets 29 act upon the magnetic ball 23 to try to push the magnetic ball 23 into the recess 27. For instance, in such embodiments, the magnets 29 may be located at or near an opening or aperture of the recess 27 through which the magnetic ball 23 will enter the recess 27. Magnetic field lines emanating from the magnets 29 may point downwards into the recess from near the opening or aperture. Depending on the position, strength and magnetic field lines of the magnets 29, the magnetic ball 23 may need to overcome a small resistance when being placed inside the recess 27.

Alternatively or additionally, the magnets 29 may be positioned such that entry of the magnetic ball 23 into the recess 27 is guided by the magnetic field lines of the magnets 29. The magnetic field lines may for instance create a potential well in the recess 27, into which the magnetic ball 23 will inevitably fall when the magnets 29 act upon the ball 23 without further input from a user.

Figure 6:
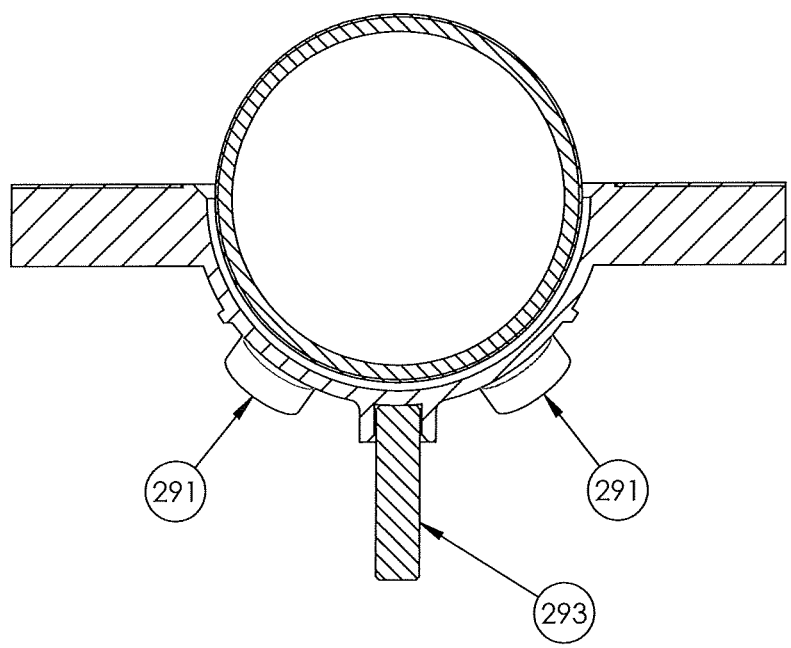
FIG. 6 schematically illustrates a trackball according to an embodiment of the invention.

In the illustrated embodiment, the magnets 29 are permanent magnets. However, in other examples, the magnets 29 may be a different type of magnets, such as electromagnets. In some embodiments, there may be one or more permanent magnets 291 and one or more electromagnets 293, as illustrated in FIG. 6. Advantageously this may help ensure that the magnetic ball 23 is urged to remain within the recess 27 even when there is no power to the trackball 21.

Furthermore, although two magnets 29 are illustrated in FIG. 2, a different number of magnets 29 may be present. For instance, some embodiments may include only one magnet 29, while other embodiments may include three or more magnets 29 (as illustrated in FIG. 6).

Figure 4:
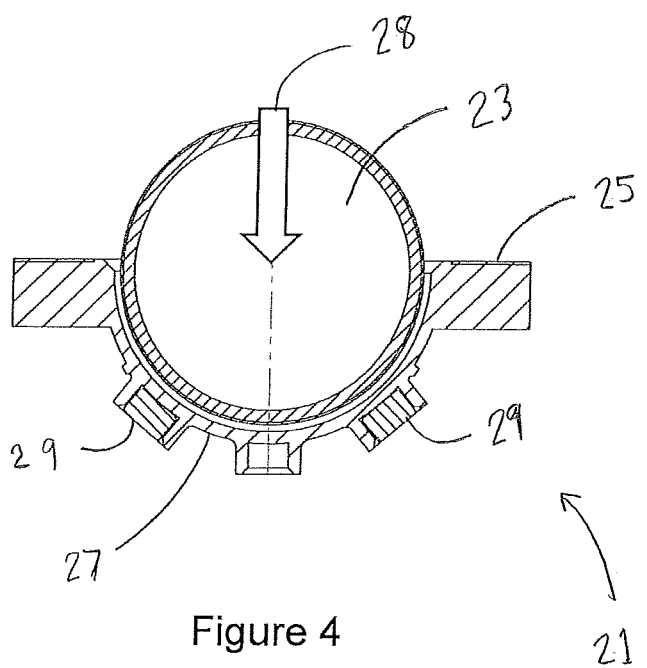
FIG. 4 schematically illustrates in cross section a trackball according to an embodiment of the invention.

The position(s) of the magnet(s) may be chosen to try to ensure optimal attraction/repulsion of the magnetic ball 23, depending on the number of magnets and/or other factors. For instance, it may be advantageous for the magnet to be located in line with or at a central, lowest point of the recess 27 if there is only one magnet. If there are two or more magnets, it may be advantageous for them to be equally offset from the centre of the recess 27, as illustrated in FIGS. 2 and 4, for example, or for one of them to be located in line with or at the centre of the recess 27 and for others to be equally offset from the centre of the recess 27, as illustrated in FIG. 6. Alternatively, it may be advantageous for the magnet(s) to be located at other positions, depending on the application and/or other parameters of the trackball 21, such as the shape and/or position of the recess 27.

The magnet(s) may be positioned to achieve particular respective frictional effects on the ball 23. For example, in embodiments where there are multiple bearing elements, the magnet(s) may be positioned such that equal frictional forces are applied to the ball 23 at the bearing elements. Alternatively, it may be desired to create a greater frictional force at one or some of the bearing elements, in which case the magnets and bearing elements may be positioned accordingly, e.g. with two magnets closer to a bearing element at which it is desired to have more friction than to a bearing element at which it is desired to have less friction. In a preferred embodiment, three bearing elements and three magnets are provided in the trackball 21, the bearing elements and the magnets being positioned such that the same frictional force is applied at each bearing element, to create a uniform frictional effect on the ball 23. The bearing elements may for example be equidistantly spaced from each other, and the magnets may also be equidistantly spaced from each other. In other embodiments, the bearing element(s) and the magnet(s) may be arranged differently.

The magnet(s) may be arranged to apply to the magnetic ball 23 a magnetic force that is greater in magnitude than the weight of the magnetic ball 23, such that the magnetic ball 23 is retained in the recess 27 even if the trackball 21 is inverted. For example, the magnitude of the magnetic force may be arranged to be at least twice the weight of the magnetic ball 23. In such cases, a user must apply a force at least twice the weight of the magnetic ball 23 in order to remove the magnetic ball 23 from the recess 27.

In case where the magnets attract rather than repel the magnetic ball 23, the magnets may be positioned such that they are closest to the lower hemisphere of the magnetic ball 23 when the ball 23 is in the recess 27. The magnets may for example be positioned below the "equator" line of the recess 27 and/or the magnetic ball 23.

The material of the housing of the trackball 21 is magnetically permeable at least in the vicinity of the recess 27 to allow the magnetic field of the magnet(s) to permeate through the walls of the housing into the recess 27, where the magnetic field acts upon the magnetic ball 23 to urge the ball to remain in the recess 27.

The trackball 21 also includes means for moving the magnets 29 relative to the recess 27 between a first position and a second position so that a distance between the magnets 29 and the magnetic ball 23 is varied. For instance, in the first position, the magnets 29 may be closer to the recess 27 (and therefore, when the magnetic ball 23 is in the recess 27, closer the magnetic ball 23) than they are when the magnets 29 are in the second position. Such movement is illustrated schematically in FIG. 2 by two double-headed arrows.

Advantageously, movement of the magnets 29 to be closer to or further away from the recess 27 (and therefore the magnetic ball 23) may allow a magnitude of attractive/repulsive force experienced by the magnetic ball 23 to be controlled and varied.

The means for moving the magnets 29 may be or include a motor, a solenoid, a rack and pinion, a linear guide, a lever arrangement or a screw thread.

The position of the magnets 29 may be adjustable during use of the trackball 21, e.g. through actuation of a button or other input means of the trackball 21. In the example illustrated in FIG. 3, the area on the trackball 21 indicated with a "+" may be an input means arranged to cause the magnets 29 to move towards the magnetic ball 23 to increase the magnetic force experienced by the ball 23 as a result of the magnetic fields of the magnet 29. This may increase the friction between the ball 23 and the bearing element(s) supporting the ball 23 (e.g. the curved surface of the recess 27 or discrete bearing elements discussed above). As a consequence, a user of the trackball 21 may need to apply a greater tangential force (tracking force) to the magnetic ball 23 to cause the ball 23 to rotate in the recess 27 relative to the housing 25, which will be perceived as greater resistance to movement, by a user.

A user of the trackball 21 may therefore adjust the required force according to his or her preference, and/or to make the trackball 21 more suitable for use in specific applications. For instance, it may be advantageous to be able to increase or decrease the friction between the magnetic ball 23 and the bearing element(s) when very fine control of the ball 23 is required, such as when the trackball 21 is being used to control surgical or other medical equipment.

Additionally or alternatively, a controller of the trackball 21 and/or other device in conjunction with which the trackball 21 is being used may be able to change the position of the magnets 29 to adjust the required force, e.g. in dependence on an output of the device in conjunction with which the trackball 21 is being used. This may enable the trackball 21 to provide feedback or other information to a user of the trackball 21.

For example, the trackball 21 may adjust the positions of the magnets 29, and therefore change the tracking force required to rotate the magnetic ball 23 relative to the housing 25, to indicate to a user that a cursor being controlled by the user with the ball 23 has reached an edge of a screen or other feature; that the user has scrolled past the end of a page or list; that a file or folder being dragged by the user from one disk location to another disk location is of a particular size (a larger file or folder may for example trigger an increase in the tangential force required to rotate the ball 23); and/or that the user has initiated or completed a particular operation. The controller may respond to commands received from different software or firmware applications, functions or tasks to provide application-specified feedback through increased or decreased friction for the magnetic ball 23.

Figure 3:
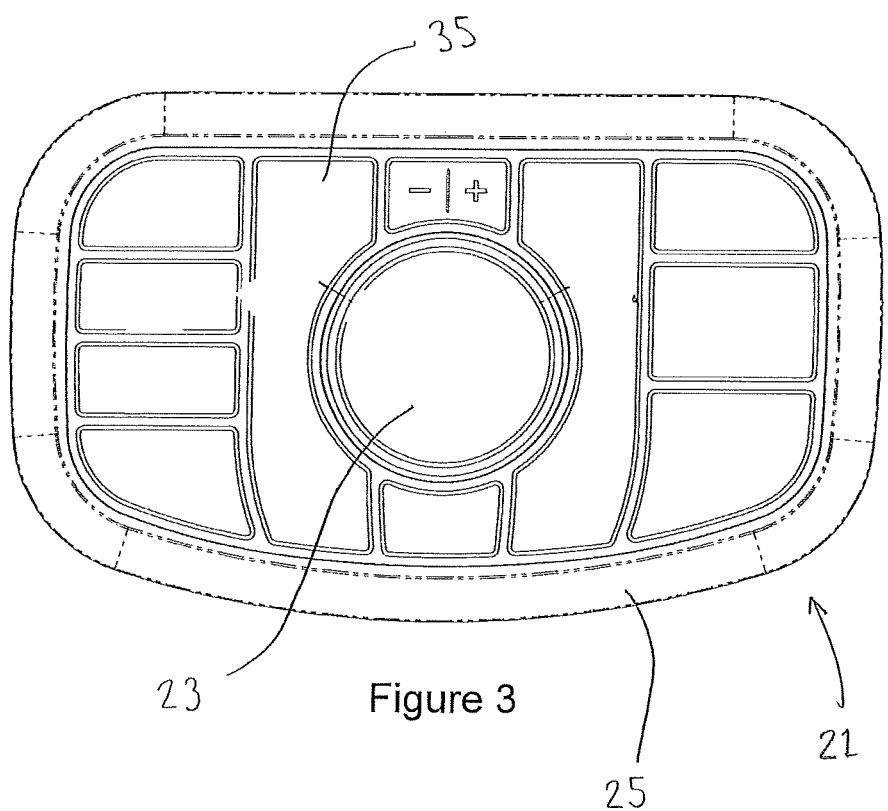
FIG. 3 schematically illustrates in top view a trackball according to an embodiment of the invention.

In some embodiments, such as the embodiment illustrated in FIG. 3, the trackball 21 includes a capacitive user input device 35. Such a capacitive user input device 35 may be arranged to receive one or more types of user input. For instance, as illustrated in FIG. 3, the capacitive user input device 35 may be divided into a plurality of different areas, each area having a respective type of user input. In FIG. 3, the area indicated with a "+" enables a user to move the magnets 29 towards the magnetic ball 23, to increase the magnetic force experienced by the ball 23 and therefore increase the force required to rotate the ball 23 in the recess 27 relative to the housing 25. Analogously, the area indicated with a "−" enables the user to move the magnets 29 away from the magnetic ball 23, to decrease the magnetic force experienced by the ball 23 and therefore decrease the force required to rotate the ball 23 in the recess 27 relative to the housing 25.

Other areas of the capacitive user input device 35 may be arranged to provide other functions, such as a zooming function, an application-switching function, a freeze function, a cancel function, a label function, a volume control function, functions corresponding to a left mouse click, a right mouse click, a scroll wheel or other user input functions, depending on the application of the trackball 21.

Advantageously, a capacitive user input device 35 divided into a plurality of areas corresponding to different functions may reduce or minimise the number of components that can come into contact with a user of the trackball 21. The single capacitive user input device 35 may for instance replace all of the buttons 15 illustrated in FIG. 1, such that there are fewer or no separate parts positioned adjacent to one another. The single capacitive user input device 35 may therefore significantly reduce the number of places (e.g. gaps between components) in which dirt, oil, water, bacteria, viruses, etc. can accumulate. Additionally, a single capacitive user input device 35 may be easier to clean than mechanical buttons. The single capacitive user input device 35 may have a single surface, making it easy to wipe, spray, sluice or otherwise clean. The surface may be substantially flat and/or smooth.

Movement of the ball may be sensed using the sealed ball arrangement described in our patent GB2387428, which then allows easy cleaning of the arrangement.

In embodiments in which an electromagnet is present, the electromagnet may be arranged such that the strength of the magnetic field emanating from the electromagnet can be varied, e.g. by applying a different voltage or load. This may be used as an additional or alternative means for varying the effect of the electromagnet on the magnetic ball 23, e.g. the magnitude of the force the magnetic ball 23 experiences due to the electromagnet.

Although some of the embodiments described above and illustrated in the figures include a plurality of magnets, other embodiments may include only a single magnet.

In the context of this document, "acceleration" refers to both positive acceleration and negative acceleration (the latter may also be referred to as "deceleration").

The invention claimed is:

1. A trackball including:
 a ball;
 a housing including a recess arranged to receive at least part of the ball; and
 means for urging the ball to, without physical or direct contact, remain in the recess, wherein the surface of the recess is fully sealed to form an impenetrable barrier such that foreign substances are prevented from entering the interior of the housing,
 wherein the means for urging the ball to remain in the recess is arranged to apply sufficient force to the ball to prevent the ball from falling out of the recess if the trackball is inverted.

2. A trackball as claimed in claim 1 not including a retaining ring for mechanically urging the ball to remain in the recess.

3. A trackball as claimed in claim 1, further including a capacitive user input device.

4. A trackball as claimed in claim 1 comprising at least one bearing element mounted on or forming part of the housing, the at least one bearing element being arranged to support the ball in the recess.

5. A trackball as claimed in claim 4 wherein the at least one bearing element comprises one or more of: a ball bearing element, and a stationary bearing element.

6. A trackball as claimed in claim 1 wherein the ball is a magnetic ball and the means for urging the ball to remain in the recess comprises at least one magnet.

7. A trackball as claimed in claim 6 including:
means for moving the at least one magnet relative to the recess between a first position and a second position so that a distance between the at least one magnet and the magnetic ball is varied.

8. A trackball as claimed in claim 6 wherein the at least one magnet is a permanent magnet or an electromagnet.

9. A trackball as claimed in claim 6 wherein the means for moving the at least one magnet includes a motor, a solenoid, a rack and pinion, a linear guide, a lever arrangement or a screw thread.

10. A trackball as claimed in claim 6 wherein the magnetic ball includes a non-magnetic but magnetically permeable outer layer, a magnetic core and/or a resin comprising magnetic filings or particles.

11. A trackball as claimed in claim 6 wherein the trackball is arranged to move the magnet in order to provide feedback or information to a user of the trackball via acceleration of the ball and/or changes in resistance to movement of the ball which may be sensed by a user's fingers during use.

12. A trackball as claimed in claim 11, wherein the mounted magnet is within the housing behind the fully sealed surface of the recess.

13. A trackball as claimed in claim 6 wherein the magnet is mounted on the housing in the vicinity of the recess.

14. A trackball as claimed in claim 1 wherein a drain is provided in the recess to allow substances to drain out of the recess.

* * * * *